(12) United States Patent
Stachnik (10) Patent No.: US 12,366,644 B2
(45) Date of Patent: Jul. 22, 2025

(54) METHOD AND DEVICE FOR ESTIMATING A VELOCITY OF AN OBJECT

(71) Applicant: Aptiv Technologies AG, Schaffhausen (CH)

(72) Inventor: Mateusz Stachnik, Gdow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 667 days.

(21) Appl. No.: 17/657,567

(22) Filed: Mar. 31, 2022

(65) Prior Publication Data

US 2022/0334238 A1    Oct. 20, 2022

(30) Foreign Application Priority Data

Apr. 15, 2021    (EP) .................................... 21168600

(51) Int. Cl.
| | | |
|---|---|---|
| *G01S 13/18* | (2006.01) | |
| *G01S 13/44* | (2006.01) | |
| *G01S 13/58* | (2006.01) | |

(52) U.S. Cl.
CPC .......... *G01S 13/18* (2013.01); *G01S 13/4427* (2013.01); *G01S 13/589* (2013.01)

(58) Field of Classification Search
CPC ...... G01S 13/44; G01S 13/4427; G06T 7/277
See application file for complete search history.

(56) References Cited

U.S. PATENT DOCUMENTS

| | | | | |
|---|---|---|---|---|
| 6,952,178 B2* | 10/2005 | Kirscht | ............... | G01S 13/9029 342/107 |
| 2004/0189521 A1* | 9/2004 | Smith | .................. | G01S 13/723 342/465 |
| 2020/0124716 A1 | 4/2020 | Millar et al. | | |
| 2020/0191938 A1* | 6/2020 | Green | .................. | B61L 25/021 |
| 2020/0386883 A1 | 12/2020 | Hofmann et al. | | |

FOREIGN PATENT DOCUMENTS

EP    3422042    1/2019

OTHER PUBLICATIONS

"Extended European Search Report", EP Application No. 21168600. 1, Oct. 8, 2021, 10 pages.

(Continued)

*Primary Examiner* — Vladimir Magloire
*Assistant Examiner* — Eric K Hodac
(74) *Attorney, Agent, or Firm* — Harness, Dickey & Pierce, P.L.C.

(57) ABSTRACT

A method is provided for estimating a velocity of an object located in the environment of a vehicle. Detections of a range, an azimuth angle and a range rate of the object are acquired for at least two different points in time via a sensor. A cost function is generated which depends on a first source and a second source. The first source is based on a range rate velocity profile which depends on the range rate and the azimuth angle, and the first source depends on an estimated accuracy for the first source. The second source is based on a position difference which depends on the range and the azimuth angle for the at least two different points in time, and the second source depends on an estimated accuracy for the second source. By minimizing the cost function, a velocity estimate is determined for the object.

18 Claims, 7 Drawing Sheets

(56) References Cited

OTHER PUBLICATIONS

Brobeit, et al., "Fusion of Doppler Radar and Geometric Attributes for Motion Estimation of Extended Objects", Oct. 2015, 5 pages.
Buhren, "Initialization Procedure for Radar Target Tracking without Object Movement Constraints", Jul. 2007, 6 pages.
Kellner, "Instantaneous Full-Motion Estimation of Arbitrary Objects using Dual Doppler Radar", Jun. 2014, 6 pages.
Kellner, et al., "Instantaneous Lateral Velocity Estimation of a Vehicle using Doppler Radar", Jul. 2013, 9 pages.
Kellner, et al., "Tracking of Extended Objects with High Resolution Doppler Radar", Dec. 2015, 13 pages.
Schlichenmaier, et al., "Clustering of Closely Adjacent Extended Objects in Radar Images using Velocity Profile Analysis", Apr. 2019, 5 pages.

* cited by examiner

METHOD AND DEVICE FOR ESTIMATING A VELOCITY OF AN OBJECT

CROSS-REFERENCE OF RELATED APPLICATION(S)

This application claims priority to European Patent Application Number 21168600.1, filed Apr. 15, 2021, the disclosure of which is hereby incorporated by reference in its entirety herein.

BACKGROUND

For some functionalities of advanced driver assistance systems (ADAS) it is important to estimate the velocity of objects located in the environment of a vehicle. Therefore, modern vehicles are often equipped with radar systems that are able to provide a reliable measurement of the radial velocity or range rate of objects by employing the Doppler effect.

In many cases, however, the direction of movement has also to be known for the objects surrounding the vehicle, e.g. for performing a reliable tracking of these objects. For object tracking, Kalman filters may be used which include a predictor step and a corrector step when estimating the trajectory of an object. However, a data association needs to be performed in order to initialize the Kalman filter, e.g. there needs to be an additional estimation for the respective initial velocity of the objects.

For estimating the initial velocity, different methods are usually applied. One example is the so-called radial assumption according to which the angle or direction of the velocity of an object is assumed to be aligned with the azimuth angle such that the magnitude of the velocity is equal to the range rate. However, this may lead to an error for the angle of the velocity up to 90° in case of an object moving perpendicularly to the radial direction with respect to the vehicle. For such an object, there may be a high probability to lose the tracking since it may not be possible to match the data e.g. from a radar system in a data association step for initializing the Kalman filter.

Another method for initializing the object velocity is the so-called environment assumption in which the angle of the velocity is estimated based on an analysis of the scene in which the vehicle is currently moving. In this method, the rate range is mapped on the angle to calculate the velocity magnitude. However, it may be difficult to define proper rules for the expected direction in which the object will move since the perception or description of the environment may be poor or may be performed after object tracking steps. For example, it is not possible within a roundabout to determine which velocity angle is to be expected in a specific part of the roundabout without having a precise estimation for the shape and the location of the roundabout.

Furthermore, a least square fit of detection positions over time may be applied as a further method for initializing the object velocity. However, such a least square fit requires many detections for several points in time to provide a robust estimation for the velocity direction. In addition, such a least square fit does not utilize the range rate information provided by radar systems.

Moreover, velocity profile algorithms may be applied for initializing the object velocity. Such an algorithm relies on several detections being performed for the same object and on the assumption that velocity vectors are identical for such raw detections belonging to the same object. It turned out that such an algorithm may be very effective for well distributed objects. However, if the azimuthal distribution of objects is rather low in a certain environment, the performance of the velocity profile algorithm may be severely limited. In addition, the range information provided by a radar system is usually completely omitted in velocity profile algorithms. Furthermore, the velocity profile algorithm may include a high computational complexity and require some computational effort since an optimization problem needs to be solved numerically.

Accordingly, there is a need to provide a method and a device for accurately estimating the magnitude and the direction of the velocity of a target object while minimizing time and effort required for the estimation.

SUMMARY

The present disclosure relates to a method and a device for estimating a velocity of a target object located in the environment of a vehicle. The present disclosure provides a computer implemented method, a computer system, and a non-transitory computer readable medium according to the independent claims. Embodiments are given in the subclaims, the description and the drawings.

In one aspect, the present disclosure is directed at a computer implemented method for estimating a velocity of a target object located in the environment of a vehicle which is equipped with a sensor and a processing unit. The sensor is configured to provide data for determining a range, an azimuth angle and a range rate of the object. According to the method, detections of the range, the azimuth angle and the range rate of the object are acquired for at least two different points in time via the sensor. Via the processing unit, a cost function is generated which depends on a first source and a second source. The first source is based on a range rate velocity profile which depends on the range rate and the azimuth angle, and the first source depends on an estimated accuracy for the first source. The second source is based on a position difference which depends on the range and the azimuth angle for the at least two different points in time, and the second source depends on an estimated accuracy for the second source. By minimizing the cost function, a velocity estimate is determined for the object.

Generally, the range, the azimuth angle and the range rate are defined with respect to the vehicle, e.g. in a vehicle coordinate system defined by longitudinal and lateral axes of the vehicle and having its origin e.g. at a front bumper of the vehicle. The term "velocity" relates to a velocity vector including the magnitude and the direction of the velocity. That is, the velocity estimate refers to the full velocity vector of the object in the environment of the vehicle. If the sensor is a radar sensor, the velocity vector may be a two-dimensional vector in bird's eye view, e.g. in a plane parallel to the ground on which the vehicle is currently moving. In this case, the velocity vector may include a component $V_x$ along a longitudinal axis of the vehicle and a component $V_y$ in a lateral direction with respect to the vehicle perpendicular to the longitudinal axis.

According to the method, two sources are used for generating the cost function, wherein the first source relies on the rate range, whereas the second source relies on the detected range and its change in time which is reflected in the position difference. For the range rate velocity profile, a constant velocity is assumed for all detection points belonging to the same object, e.g. for a "cloud" of detections, wherein the velocity vectors for each of the detections may differ by the respective azimuth angle only. The range rate velocity profile on which the first source relies may depend on a range rate equation. The two sources are weighted by their respective estimated accuracy when generating the cost function which is minimized for determining the velocity estimate for the object. The respective accuracy for the first and second source may be estimated by using a known or empirically determined accuracy of the sensor with respect to the detection of the rate, the azimuth angle and the rate range. Alternatively, the respective accuracy for the first and second source may be estimated based on respective variances of the rate, the azimuth angle and the rate range if a plurality of detections is available for the object.

The method utilizes the full information which is available e.g. from a radar system regarding the location (e.g. range and azimuth angle) and regarding the radial velocity (range rate). The range rate may be determined based on the Doppler effect as is known in the art.

Since the full information provided by the sensor is used for the first and second velocity estimates, the accuracy for determining the velocity estimate is improved in comparison to an estimate based on one of the two "sources" only, e.g. either based on the range rate or based on the rate in combination with the azimuth angle. In addition, the time for determining the velocity estimate is reduced by applying the cost function to be minimized, e.g. in comparison to least square fits and other optimization approaches.

The method may comprise one or more of the following features:

A plurality of detections of the range, the azimuth angle and the range rate may be acquired for the object for each of the at least two points in time, and a respective standard deviation may be estimated for the range, the azimuth angle and the range rate based on the plurality of detections. The range rate velocity profile may depend on the plurality of detections of the rate range and the azimuth angle, and the position difference may depend on the plurality of detections of the range and the azimuth angle for the at least two different points in time. The estimated accuracy of the first source may depend on the standard deviation of the range rate and the standard deviation of the azimuth angle, and the estimated accuracy of the second source may depend on the standard deviation of the range and the standard deviation of the azimuth angle Different standard deviations of the range, the azimuth angle and the range rate may be estimated for each of the at least two points in time and/or for each detection of the range, the azimuth angle and the range rate.

The first source and the second source may be based on a normalized estimation error squared (NEES) which includes the respective standard deviations of the range, the azimuth angle and the range rate. The cost function may comprise a first contribution based on a normalized estimation error squared (NEES) related to the first source and a second contribution based on a normalized estimation error squared (NEES) related to the second source. The first contribution and the second contribution may each comprise a sum of elements over the plurality of detections, wherein each element may be estimated as a normalized estimation error squared (NEES) for the respective detection. The elements of the first contribution may be based on a range rate equation and on the standard deviation of the range rate, whereas the elements of the second contribution may be based the position difference for the respective detection and on a velocity covariance matrix estimated based on the standard deviations of the range and the azimuth angle and based on a time interval between the at least two different points in time for which the range and the azimuth angle are acquired by the sensor. Further, the cost function may be generated as an average of the first contribution and the second contribution.

A component of the velocity may be estimated by setting the derivative of the cost function with respect to the velocity component to zero. The cost function and the velocity estimate may be determined by assuming a constant velocity of the object in order to initialize a Kalman filter state estimation of the velocity.

According to an embodiment, a plurality of detections of the range, the azimuth angle and the range rate may be acquired for the object for each of the at least two points in time. Based on the plurality of detections, a respective standard deviation may be estimated for the range, for the azimuth angle and for the range rate. The range rate velocity profile may depend on the plurality of detections of the rate range and the azimuth angle, and the position difference may depend on the plurality of detections of the range and the azimuth angle for the at least two different points in time. The estimated accuracy of the first source may depend on the standard deviation of the range rate and the standard deviation of the azimuth angle, and the estimated accuracy of the second source may depend on the standard deviation of the range and the standard deviation of the azimuth angle.

The plurality of detections belonging to the same object may also be regarded as a cloud of detections. The respective standard deviations reflect an accuracy estimation for the range, the azimuth angle and the range rate, respectively. Since the cost function represents a weighting between the first source and the second source, the weighting may be improved by additionally incorporating the respective standard deviations. Therefore, the accuracy of the velocity estimate may also be improved.

Different standard deviations of the range, the azimuth angle and the range rate may be estimated for each of the at least two points in time and/or for each detection of the range, the azimuth angle and the range rate. By this means, the accuracy of the velocity estimate may further be enhanced.

Furthermore, the first source and the second source may be based on a normalized estimation error squared (NEES) which may include the respective standard deviations of the range, the azimuth angle and the range rate. That is, the velocity estimate may rely on the cost function which may be determined by calculating the normalized estimation error squared. The normalized estimation error squared is typically used for a consistency check of variance estimations. For the present method for estimating the velocity of the object, the normalized estimation error squared may be used for generating the cost function based on the respective standard deviations which may increase the accuracy of the cost function and of the velocity estimate.

The cost function may comprise a first contribution based on a normalized estimation error squared (NEES) related to the first source and a second contribution based on a normalized estimation error squared (NEES) related to the second source. In addition, the first contribution and the second contribution may each comprise a sum of elements over the plurality of detections, wherein each element may be estimated as a normalized estimation error squared (NEES) for the respective detection. The elements of the first contribution may be based on a rate range equation and on the standard deviation of the range rate which may reflect the range rate accuracy of the sensor. The elements of the second contribution may be based on the position difference for the respective detection and on a velocity covariance matrix estimated based on the standard deviations of the range and the azimuth angle and based on a time interval between the at least two different points in time for which the range and the azimuth angle are acquired by the sensor. In detail, the inverse of the velocity covariance matrix may be used for estimating the respective normalized estimation error squared. Furthermore, the cost function may be generated as an average of the first contribution and the second contribution. In detail, the cost function may be the sum of the normalized estimation error squared related to the first source and the normalized estimation error squared related to the second source, wherein the sum is divided by two.

Therefore, generating the cost function may be split into different parts each depending from respective normalized estimation error squared and from different standard deviations. This may reduce the computational effort for generating the cost function. Estimating the average of two contributions may be a straightforward manner for generating a total cost function. The computational effort may also be reduced since the contributions to the cost function may allow at least partly for an analytical formulation.

According to a further embodiment, a component of the velocity may be estimated by setting the derivative of the cost function with respect to the velocity component to zero. This may be a straightforward way for minimizing the cost function in order to estimate the components of the velocity estimate and may require a low computational effort. In case of a radar sensor, two components $V_x$ and $V_y$ of the velocity estimate (e.g. along the longitudinal axis and along the lateral axis, respectively, of the vehicle) may be estimated by the zero of the respective derivatives.

According to a further embodiment, the cost function and the velocity estimate may be determined by assuming a constant velocity of the object in order to initialize a Kalman filter state estimation of the velocity. That is, the method may be applied for initializing the Kalman filter which may be used for tracking the further trajectory of the object. Assuming a constant velocity may reduce the required mathematical and computational effort and reduce the time required for initializing the Kalman filter. As an alternative, the velocity estimate may be used as a crosscheck for the result of a velocity estimation provided by a Kalman filter used for object tracking.

In another aspect, the present disclosure is directed at a device for estimating a velocity of an object located in the environment of a vehicle. The device comprises a sensor configured to provide data for acquiring detections of a range, an azimuth angle and a range rate of the object for at least two different points in time. The device further comprises a processing unit configured to generate a cost function which depends on a first source and a second source. The first source is based on a range rate velocity profile which depends on the range rate and the azimuth angle and the first source depends on an estimated accuracy for the first source. The second source is based on a position difference which depends on the range and the azimuth angle for the at least two different points in time, and the second source depends on an estimated accuracy for the second source. The processing unit is further configured to determine a velocity estimate for the object by minimizing the cost function.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the device according to the disclosure includes a sensor and a processing unit which are configured to perform the steps as described above for the corresponding method. Therefore, the benefits, the advantages and the disclosure as described above for the method are also valid for the device according to the disclosure.

According to an embodiment, the sensor may include a radar sensor and/or a Lidar sensor. Data provided by these sensors may be suitable for determining the range, the azimuth angle and the range rate of the object in a straightforward manner.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically:

FIGS. 3A to 5D depict verification results for the first scenario, FIGS. 7A through 9D depict verification results for the second scenario.

DETAILED DESCRIPTION

Figure 1:
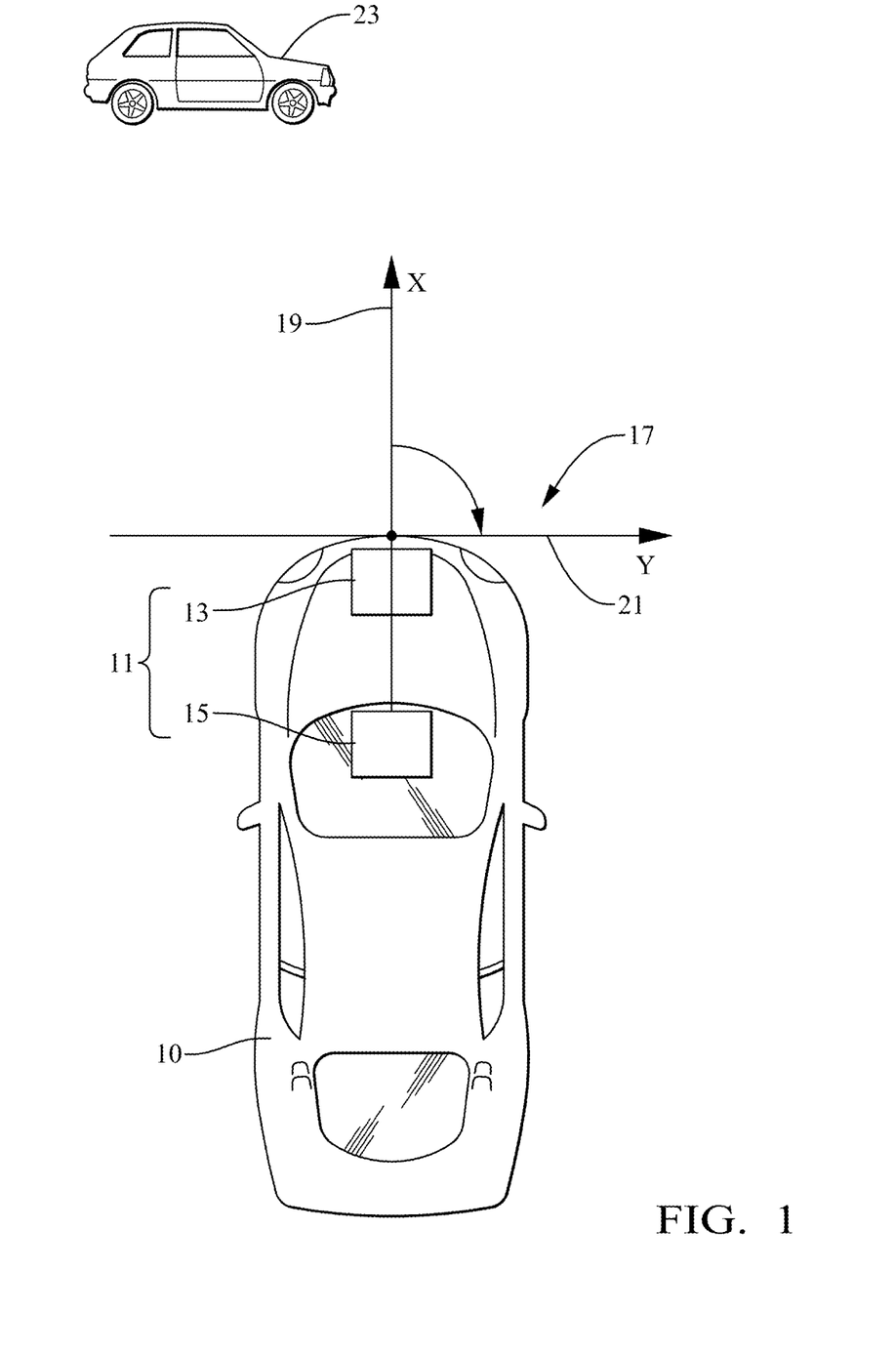
FIG. 1 depicts an overview of a device according to the disclosure, which is installed in a vehicle.

FIG. 1 schematically depicts vehicle 10 which is equipped with the device 11 according to the disclosure. The device 11 includes a radar sensor 13 for monitoring the environment of the vehicle 10 and a processing unit 15 which receives data from the sensor 13.

FIG. 1 also depicts a vehicle coordinate system 17 having an origin which is located at a center of a front bumper of the vehicle 10. The vehicle coordinate system 17 includes an x-axis 19 which is parallel to the longitudinal axis of the vehicle 10, and a y-axis 21 which is perpendicular to the x-axis 19 and points to the right in FIG. 1. Since the vehicle coordinate system 17 is a right-handed coordinate system, a z-axis (not shown) is pointing into the page.

The device 11 is provided for detecting objects in the environment of the vehicle 10 such as a target object 23 shown in FIG. 1. That is, the radar sensor 13 detects radar reflections from the target object 23 which may also be regarded as raw detections. Based on the raw detections, the device 11 is configured to determine a position for the respective detection, e.g. the position of a reflection point at the target object 23 via the processing unit 15. The position is given by a range r and an azimuth angle θ with respect to the vehicle 10, e.g. defined in the vehicle coordinate system 17. In addition, the device 11 is also configured to determine a range rate or radial velocity for each raw detection.

In addition, the raw detections are captured for a plurality of points in time (e.g. at least two). The detections for a certain point in time are also regarded as a radar scan, whereas the detections belonging to the same object are regarded as a cloud.

For each radar scan (or measurement instance), the radar sensor 13 captures m raw detections from the target object 23. The number m is typically 3 to 5. Each raw detection is indexed by i and described by the following parameters expressed in the vehicle or sensor coordinate system 17:

$r_i$: range (or radial distance)
$\theta_i$: azimuth angle
$\dot{r}_i$: raw range rate (or radial velocity), wherein i=1, ..., m.

In addition, the accuracy of each of these detection attributes is assumed to be known (from the accuracy of the radar sensor 13) and is represented by the respective standard deviations $\sigma_\theta$, $\sigma_r$, $\sigma_{\dot{r}}$, or $\sigma_{\dot{r}_{comp}}$, wherein $\sigma_{\dot{r}_{comp}}$ is the standard deviation for the compensated range rate which is explained below. Each of the m detections has a different accuracy, e.g. a different standard deviation.

The range rate equation for a single raw detection i is given as follows:

$$\dot{r}_i + V_s^x \cos\theta_i + V_s^y \sin\theta_i = V_{t,i}^x \cos\theta_i + V_{t,i}^y \sin\theta_i \quad (1)$$

wherein $V_s$ denotes the current velocity of the host vehicle 10 and $V_t$ denotes the velocity to be determined for the target object 23. The components of the velocity vector of the target object 23, e.g. $V_x$ and $V_y$, are defined along the x-axis 19 and the y-axis 21, respectively, of the vehicle coordinate system 17 (see FIG. 1). To simplify the notation, a compensated range rate is introduced and defined as:

$$\dot{r}_{i,cmp} = \dot{r}_i + V_s^x \cos\theta_i + V_s^y \sin\theta_i \quad (2)$$

wherein $\dot{r}_{i,cmp}$ is the compensated range rate of the i-th raw detection.

Then the above equation can be reduced to:

$$\dot{r}_{i,cmp} = V_{t,i}^x \cos\theta_i + V_{t,i}^y \sin\theta_i \quad (3)$$

The range rate equation is represented in vector form as:

$$\dot{r}_{i,cmp} = [\cos\theta_i \; \sin\theta_i] \begin{bmatrix} V_{t,i}^x \\ V_{t,i}^y \end{bmatrix} \quad (4)$$

An estimate 45 (see FIGS. 3, 4, 7 and 8) for the velocity of the target object relies on two sources for estimating the velocity of the target object 23. These are defined as follows:

1. A velocity profile which is determined based on the rate range equation:

$$\dot{r}_{comp_i} = V_x \cos(\theta_i) + V_y \sin(\theta_i) \quad (5)$$

2. A position difference which is defined as follows:

$$V_x = \frac{x_t - x_{t-dt}}{dt} \quad (6)$$

$$V_y = \frac{y_t - y_{t-dt}}{dt}$$

For the velocity profile (which may also be referred to as range rate velocity profile), it is assumed that all m detections belonging to the "distributed" target object 23 have the same absolute value for their velocity, but different azimuth angles. Therefore, the velocity vectors belonging to detections of the target object form the velocity profile. For the position difference, dt denotes the time difference between two points in time for which two detections are acquired.

Both sources of velocity have to be combined for determining the estimate 45 for the velocity, e.g. both sources need to be weighted utilizing estimated accuracies or standard deviations of the detections. For weighting the two sources according to equations (5) and (6), a Normalized Estimation Error Squared (NEES) can be used which is generally defined as follows:

$$e_k = (X_k - \hat{x})^T \hat{P}_k^{-1} (X_k - \hat{x}) \quad (7)$$

$\hat{P}_k^{-1}$ denotes the inverse of the covariance matrix, and $\hat{x}$ denotes an estimate based on measurements $X_k$. The Normalized Estimation Error Squared (NEES) is usually employed for a consistency check of a variance estimation. For the present disclosure, the NEES is used to define a cost function Q for the two sources as defined above for the velocity estimation:

$$Q = \tfrac{1}{2}(NEES_{VP} + NEES_{PD}) \quad (8)$$

The first term or contribution is regarded as Velocity Profile NEES and is calculated as follows:

$$NEES_{VP} = \sum_i \frac{(V_x \cos(\Theta_i) + V_y \sin(\Theta_i) - \dot{r}_{comp_i})^2}{\sigma_{\dot{r}_{comp_i}}^2} \quad (9)$$

The second term or contribution is regarded as Position Difference NEES and can be calculated as follows:

$$NEES_{PD} = \Sigma_j V_{diff,j} (\sigma_{V_j})^{-1} V_{diff,j}^T \quad (10)$$

wherein:

$$V_{diff,j} = V - V_j \quad (11)$$

and $V = [V_x \; V_y]$ is the "true" velocity of the target object 23 which is to be estimated. Here and in the following, j denotes the index of the detection within the Position Difference NEES, e.g. in the same manner as described above for the index i.

The respective vector $V_j$ includes both components of the velocity based on the position difference and given by equation (6):

$$V_j = [V_{x,j} V_{y,j}] \quad (12)$$

The velocity covariance matrix of equation (10) is defined as:

$$\sigma_{V_j}^2 = \begin{bmatrix} \sigma_{V_x V_x, j} & \sigma_{V_x V_y, j} \\ \sigma_{V_y V_x, j} & \sigma_{V_y V_y, j} \end{bmatrix} \quad (13)$$

which may also be written as:

$$\sigma_{V_j}^2 = \frac{\sigma_A^2 + \sigma_B^2}{dt^2} \quad (13')$$

wherein A and B denote two different points in time (separated by a time interval dt) for which the respective covariance matrix is determined, and wherein:

$$\sigma_A^2 = \begin{bmatrix} \sigma_{A_{xx}} & \sigma_{A_{xy}} \\ \sigma_{A_{yx}} & \sigma_{A_{yy}} \end{bmatrix} = J_{pol2cart} \sigma_{A_{pol}}^2 J_{pol2cart}^T \quad (14)$$

$$J_{pol2cart} = \begin{bmatrix} \cos(\Theta_{j,A}) & -r_i \sin(\Theta_{j,A}) \\ \sin(\Theta_{j,A}) & r_i \cos(\Theta_{j,A}) \end{bmatrix}$$

$$\sigma_{A_{pol}}^2 = \begin{bmatrix} \sigma_{r,A}^2 & 0 \\ 0 & \sigma_{\Theta,A}^2 \end{bmatrix}$$

Hence, the velocity variance finally depends on $\theta$ and on the standard deviations of r and $\theta$. It is noted that the above definitions are also valid accordingly for the second point in time denoted by B.

The term of Position Difference NEES may be simplified:

$$NEES_{PD} = \sum_j V_{diff,j} (\sigma_{V_j})^{-1} V_{diff,j}^T = \quad (15)$$

$$\sum_j \frac{(V_x - V_{x,j})^2 \sigma_{V_{yy,j}} - 2(V_y - V_{y,j})(V_x - V_{x,j})\sigma_{V_{xy,j}} + (V_y - V_{y,j})^2 \sigma_{V_{xx,j}}}{|\sigma_{V_j}|}$$

wherein:

$$|\sigma_{V_j}| = \sigma_{V_{xx,j}} \sigma_{V_{yy,j}} - \sigma_{V_{xy,j}} \sigma_{V_{xy,j}} \quad (16)$$

Finally, the entire or total NEES cost function can be written as:

$$Q = \frac{1}{2} \left( \sum_i \frac{(V_x \cos(\Theta_i) + V_y \sin(\Theta_i) - \dot{r}_{comp_i})^2}{\sigma_{\dot{r}_{comp_i}}^2} + \right. \quad (17)$$

$$\left. \sum_j \frac{(V_x - V_{x,j})^2 \sigma_{V_{yy,j}} - 2(V_y - V_{y,j})(V_x - V_{x,j})\sigma_{V_{xy,j}} + (V_y - V_{y,j})^2 \sigma_{V_{xx,j}}}{|\sigma_{V_j}|} \right)$$

To find $V_x$ and $V_y$, the entire NEES cost function Q is minimized analytically by calculating the first derivative to find global minimum:

$$\frac{dQ}{dV_x} = \sum_i \frac{V_x \cos^2(\Theta_i) + V_y \cos(\Theta_i)\sin(\Theta_i) - \cos(\Theta_i)\dot{r}_{comp_i}}{\sigma_{\dot{r}_{comp_i}}^2} + \quad (18)$$

$$\sum_j \frac{V_x \sigma_{V_{yy,j}} - V_{x,j}\sigma_{V_{yy,j}} - V_y \sigma_{V_{xy,j}} + V_{y,j}\sigma_{V_{xy,j}}}{|\sigma_{V_j}|}$$

-continued $$\frac{dQ}{dV_y} = \sum_i \frac{V_x \cos(\Theta_i)\sin(\Theta_i) + V_y \sin^2(\Theta_i) - \sin(\Theta_i)\dot{r}_{comp_i}}{\sigma_{\dot{r}_{comp_i}}^2} +$$

$$\sum_j \frac{-V_x \sigma_{V_{xy,j}} + V_{x,j}\sigma_{V_{xy,j}} + V_y \sigma_{V_{xx,j}} - V_{y,j}\sigma_{V_{xx,j}}}{|\sigma_{V_j}|}$$

For determining the minimum of the NEES cost function, these derivatives are set equal to zero:

$$\frac{dQ}{dV_x} = 0, \quad \frac{dQ}{dV_y} = 0 \quad (19)$$

Some reorganization of the above equations can be performed as follows:

$$\sum_i \frac{\cos(\Theta_i)\dot{r}_{comp_i}}{\sigma_{\dot{r}_{comp_i}}^2} + \sum_j \frac{V_{x,j}\sigma_{V_{yy,j}} - V_{y,j}\sigma_{V_{xy,j}}}{|\sigma_{V_j}|} = \quad (20)$$

$$V_x \left( \sum_i \frac{\cos^2(\Theta_i)}{\sigma_{\dot{r}_{comp_i}}^2} + \sum_j \frac{\sigma_{V_{yy,j}}}{|\sigma_{V_j}|} \right) + V_y \left( \sum_i \frac{\cos(\Theta_i)\sin(\Theta_i)}{\sigma_{\dot{r}_{comp_i}}^2} + \sum_j \frac{-\sigma_{V_{xy,j}}}{|\sigma_{V_j}|} \right)$$

$$\sum_i \frac{\sin(\Theta_i)\dot{r}_{comp_i}}{\sigma_{\dot{r}_{comp_i}}^2} + \sum_j \frac{V_{y,j}\sigma_{V_{xx,j}} - V_{x,j}\sigma_{V_{xy,j}}}{|\sigma_{V_j}|} =$$

$$V_x \left( \sum_i \frac{\cos(\Theta_i)\sin(\Theta_i)}{\sigma_{\dot{r}_{comp_i}}^2} + \sum_j \frac{-\sigma_{V_{xy,j}}}{|\sigma_{V_j}|} \right) + V_y \left( \sum_i \frac{\sin^2(\Theta_i)}{\sigma_{\dot{r}_{comp_i}}^2} + \sum_j \frac{\sigma_{V_{xx,j}}}{|\sigma_{V_j}|} \right)$$

$$S_{xx} = \sum_i \frac{\cos^2(\Theta_i)}{\sigma_{\dot{r}_{comp_i}}^2} + \sum_j \frac{\sigma_{V_{yy,j}}}{|\sigma_{V_j}|};$$

$$S_{xy} = \sum_i \frac{\cos(\Theta_i)\sin(\Theta_i)}{\sigma_{\dot{r}_{comp_i}}^2} + \sum_j \frac{-\sigma_{V_{xy,j}}}{|\sigma_{V_j}|}$$

$$S_x = \sum_i \frac{\cos(\Theta_i)\dot{r}_{comp_i}}{\sigma_{\dot{r}_{comp_i}}^2} + \sum_j \frac{V_{x,j}\sigma_{V_{yy,j}} - V_{y,j}\sigma_{V_{xy,j}}}{|\sigma_{V_j}|}$$

$$S_{xy} = \sum_i \frac{\cos(\Theta_i)\sin(\Theta_i)}{\sigma_{\dot{r}_{comp_i}}^2} + \sum_j \frac{-\sigma_{V_{xy,j}}}{|\sigma_{V_j}|};$$

$$S_{yy} = \sum_i \frac{\sin^2(\Theta_i)}{\sigma_{\dot{r}_{comp_i}}^2} + \sum_j \frac{\sigma_{V_{xx,j}}}{|\sigma_{V_j}|}$$

$$S_y = \sum_i \frac{\sin(\Theta_i)\dot{r}_{comp_i}}{\sigma_{\dot{r}_{comp_i}}^2} + \sum_j \frac{V_{y,j}\sigma_{V_{xx,j}} - V_{x,j}\sigma_{V_{xy,j}}}{|\sigma_{V_j}|}$$

Finally, this leads to two equations depending from the two variables $V_x$ and $V_y$:

$$\begin{cases} S_x = V_x S_{xx} + V_y S_{xy} \\ S_y = V_x S_{yx} + V_y S_{yy} \end{cases} \quad (21)$$

wherein $S_{xy} = S_{yx}$

By defining the following abbreviations:

$$W = S_{xx} S_{yy} - S_{xy} S_{yx}$$

$$W_x = S_x S_{yy} + S_{xy} S_y$$

$$W_y = S_{xx} S_y + S_x S_{yx} \quad (22)$$

the velocity of the target object 23 is estimated as follows:

$$\text{velocity estimate}: \begin{cases} V_x = \dfrac{W_x}{W} \\ V_y = \dfrac{W_y}{W} \end{cases} \quad (23)$$

In summary, the two components $V_x$ and $V_y$ of the velocity vector of the target object 23 (see FIG. 1) are determined in dependence of the factors $S_x$, $S_y$, $S_{xy}$ (=$S_{yx}$), $S_{xx}$ and $S_{yy}$ which dependent on the input data in the form of the range $r_i$, the angle $\theta_i$ and the rate range $\dot{r}_i$ and their corresponding standard deviations a for all raw detections belonging to the target object 23.

The velocity vector of the target object 23 is therefore determined analytically based on the input data and based on the NEES cost function. The NEES includes a respective first and second contribution for each of the two sources for estimating the velocity, e.g. for the velocity profile which is based on the rate range equation and for the position difference which depends on the range and the azimuth angle for each detection. When combining these two contributions, the velocity profile NEES and the position difference NEES are weighted by the respective standard deviations which reflect the accuracy of the sensor measurements.

Since two sources for estimating the velocity are considered and the cost function is minimized, the accuracy of a velocity estimate is improved in comparison to methods which rely on one of these sources for estimating the velocity only. Due to the analytical expression as shown explicitly above, performing the method requires a low computational effort and a minimum time. Hence, the method is easy to be embedded in automotive systems.

Figure 2:
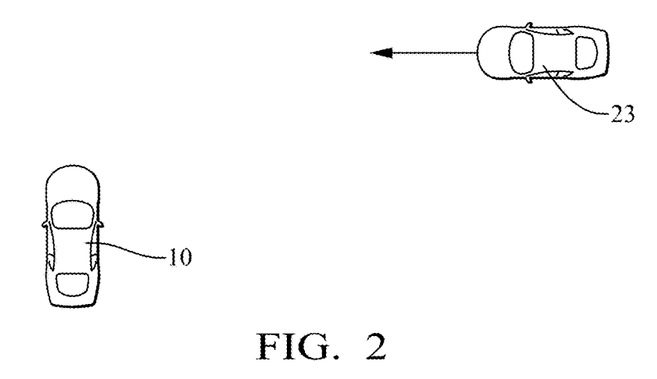
FIG. 2 depicts a first scenario for verifying a method according to the disclosure.
Figure 6:
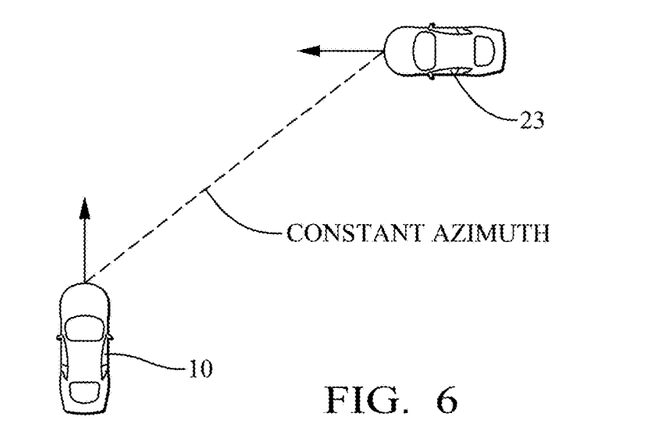
FIG. 6 depicts a second scenario for verifying the method according to the disclosure.

For verifying the method according to the disclosure, two different scenarios are considered in FIGS. 2 and 6, respectively. The results for the two scenarios are shown in FIGS. 3 to 5 and FIGS. 7 to 9, respectively.

The first scenario is shown in FIG. 2 and includes a non-moving vehicle 10 (e.g. host vehicle velocity=(0,0) km/h) and the moving object 23 having a velocity of (0, −50) km/h. That is, the target object 23 crosses the vehicle 10 laterally along the y-axis 21 (see FIG. 1).

The velocity estimation is performed with time steps of dt=100 ms, and single point detections are generated from the front left corner of the target object 23 for each time step or point in time. Furthermore, constant detection accuracies (standard deviations) are assumed to be: $\sigma_\theta$=0.3 deg, $\sigma_r$=0.15 m and $$\sigma_{\dot{r}_{comp}} = 0.05 \, \frac{\text{m}}{\text{s}}.$$

In FIGS. 3, 4, 7 and 8, the respective results are depicted in a velocity coordinate system having a longitudinal axis 31 for $V_x$ and a lateral axis 33 for $V_y$, wherein the respective velocity component is depicted in m/s. That is, the velocity of the moving object 23 is represented by a reference 35 at (0, −13,89) m/s for the first scenario in FIGS. 3 and 4.

In FIG. 3, estimation results are depicted based on three radar scans, e.g. three detections for the range rate and two detections for the position difference have been available for estimating the velocity. In FIG. 3A, single estimates are shown with respect to the reference 35 representing the "true" velocity. Two position difference-based velocity estimates 37A, 37B are depicted together with their respective standard deviations 39A, 39B which are represented by dashed lines. Furthermore, velocity estimates 41 based on the range rate is represented as lines. This is due to the fact that the range rate, e.g. the radial velocity with respect to the vehicle, is used only for the velocity estimate 41. The three lines which are denoted by "rr based velocity" in FIG. 3A correspond to the three detections of the range rate and are almost identical. As can be seen in FIG. 3A, the velocity estimates 37A, 37B based on the position difference deviate strongly from the reference 35.

Figure 3A:
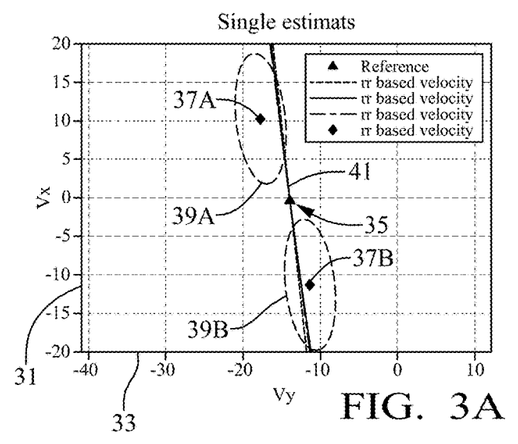
Figure 3B:
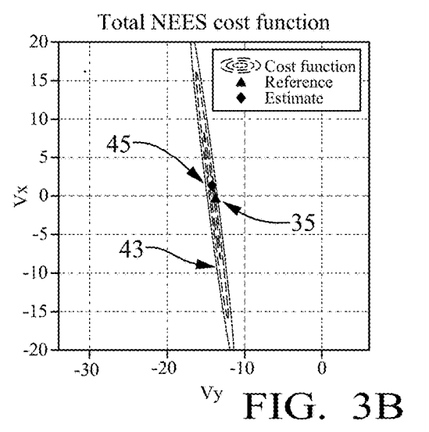
Figure 3C:
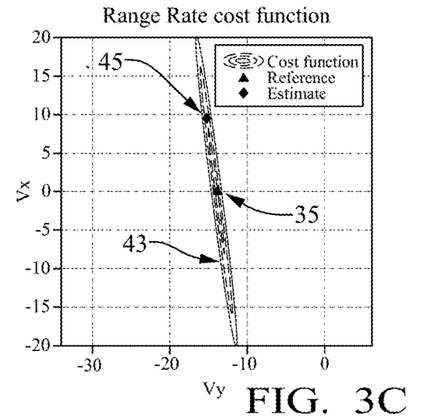
Figure 3D:
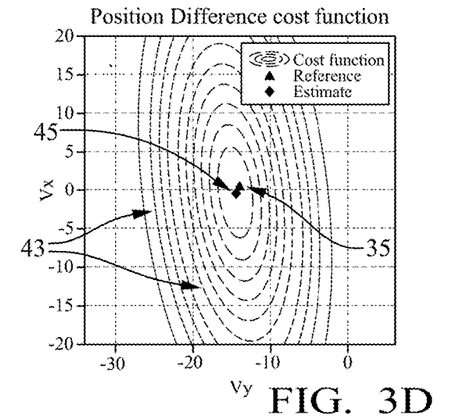

In FIGS. 3B, 3C and 3D, respective cost functions are depicted which are calculated based on the formulas provided above. Each cost function is represented by contour lines 43. In addition, a respective estimate 45 for the velocity is shown which is determined as an absolute minimum of the respective cost function. In FIG. 3B, the total NEES cost function is shown including a first contribution for the velocity profile based on the rate range and a second contribution based on the position difference. In FIGS. 3C and 3D, the two contributions are depicted separately, e.g. a velocity profile cost function or rate range cost function in FIG. 3C and a position difference cost function in FIG. 3D.

As can be seen in FIGS. 3B and 3D, the estimates 45 for the velocity of the target object 23 are quite close to the reference 35, whereas the estimate 45 based on the rate range cost function strongly deviates from the reference 35. On the other hand, the total NEES cost function and the rate range cost function have a very small extension in the direction of $V_y$ in comparison to the position difference cost function. Therefore, the velocity estimate 45 based on the total NEES cost function has a smaller error bar than the estimate 45 based on the position difference cost function. Hence, the velocity estimate 45 based on the total NEES cost function is more reliable than the velocity estimate 45 based on the position difference cost function although the component $V_x$ is slightly closer to the reference 35 for the position difference cost function.

For FIG. 4, thousands of Monte Carlo simulations have been performed for the first scenario assuming the same conditions as in FIG. 3, e.g. respective three radar scans for each Monte Carlo simulation. In FIGS. 4B, 4C and 4D, the respective results for the estimations 45 based on the Monte Carlo simulation are shown for the same conditions as in FIGS. 3B, 3C and 3D, e.g. for the total NEES cost function (FIG. 4B), for the rate range cost function (FIG. 4C) and for the position difference cost function (FIG. 4D). The estimates 45 are depicted as point clouds with respect to the reference 35. As can be seen in FIG. 4B, the estimates 45 are generally quite close to the reference 35 for the total NEES cost function, e.g. very close to the reference in the direction of $V_x$ and quite close in an acceptable manner in the direction of $V_y$. In contrast, the estimates 45 strongly spread in the direction of $V_x$ for the rate range cost function as shown in FIG. 4C, whereas the estimate 45 show quite a large spread in the direction of $V_y$ for the position difference cost function as shown in FIG. 4D. In summary, the estimates 45 are most "concentrated" around the reference 35 for the total NEES cost function in FIG. 4B.

Figure 4A:
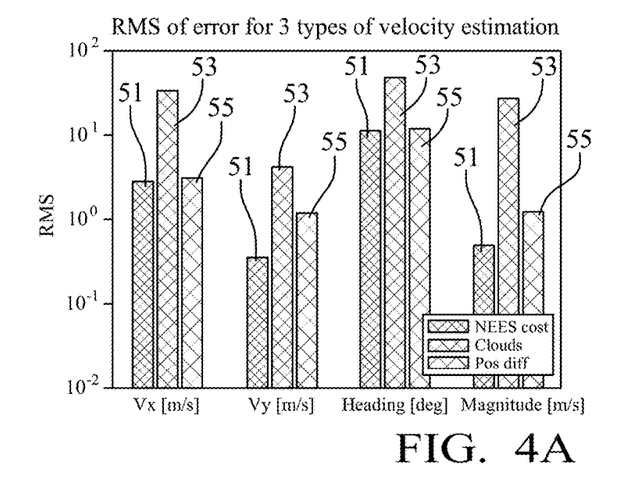
Figure 4B:
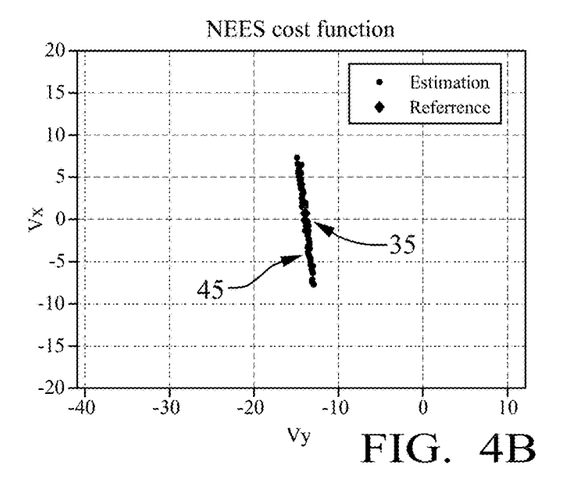
Figure 4C:
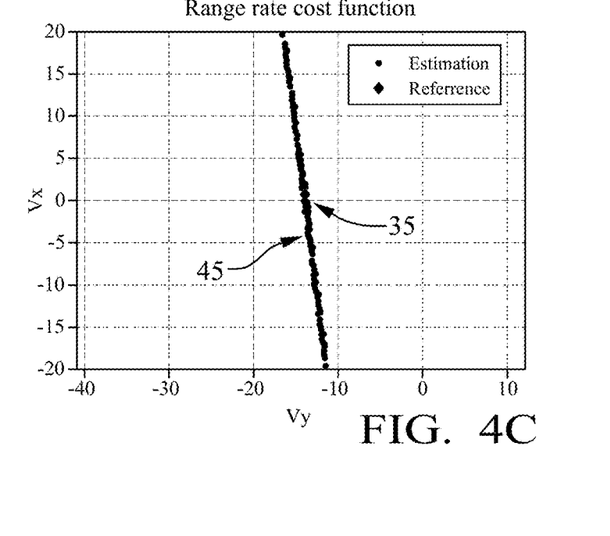
Figure 4D:
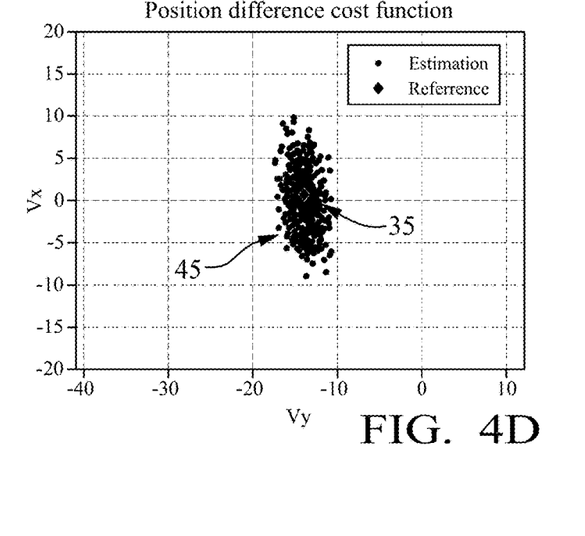
Figure 5A:
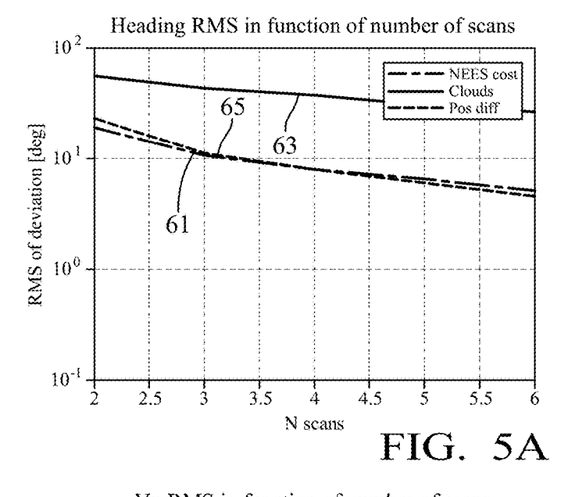
Figure 5B:
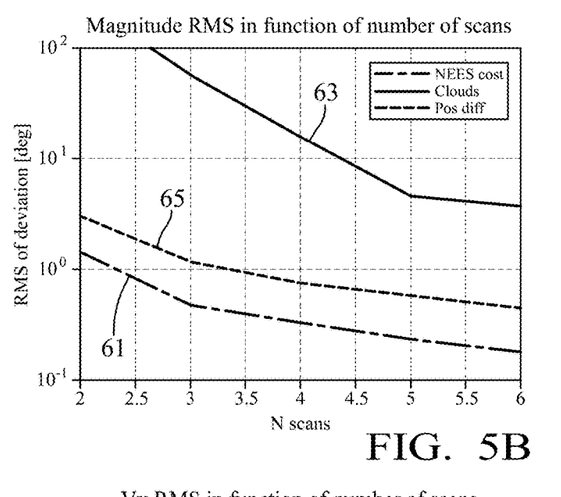
Figure 5C:
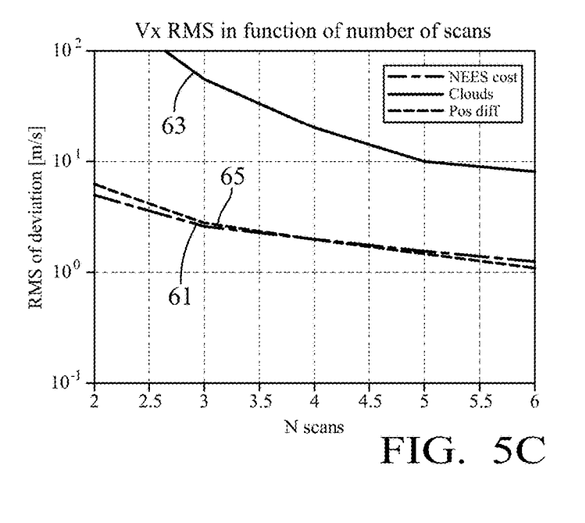
Figure 5D:
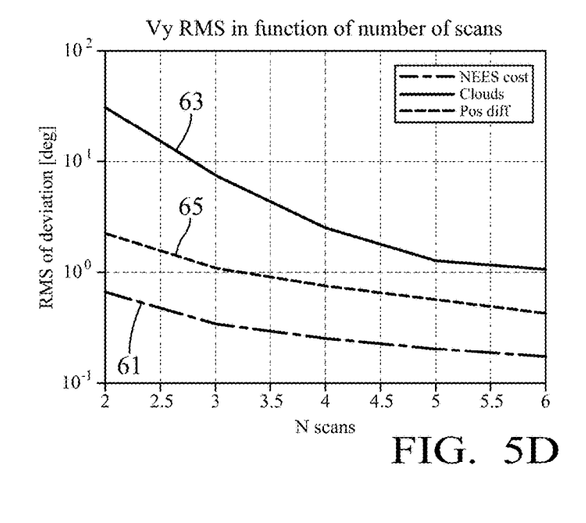

This is also reflected in the statistics as shown in FIG. 4A, in which the root mean square of the error or deviation is depicted for the three types of velocity estimation, e.g. based on the total NEES cost function (depicted as bars 51), based on the range rate cost function (depicted by the bars 53), and based on the position difference cost function (depicted as bars 55). Please note that the term "cloud" is used as synonym for the range rate cost function in the legend of FIG. 4A. The respective root mean square is shown for both velocity components $V_x$ and $V_y$, for the heading or direction of the velocity and for the magnitude or absolute value of the velocity. The velocity estimation based on the total NEES cost function shows the lowest root mean square of the deviations in all cases.

This is also confirmed by the results as shown in FIG. 5. The respective root mean square of the deviations (on the y-axis) is shown depending from the number of radar scans (on the x-axis) for the heading (FIG. 5A), for the magnitude (FIG. 5B), for the velocity component $V_x$ (FIG. 5C) and for the velocity component $V_y$ (FIG. 5D). The lines 61 represent the respective root mean square of the deviations for the velocity estimates based on the total NEES cost function, wherein the lines 63 represent the root mean square of the deviations of velocity estimates based on the range rate cost function, and the lines 65 represent the root mean square of the deviation for the velocity estimates based on the position difference cost function. As can be seen, the root mean square of the deviations has the lowest value in almost all cases for the velocity estimate based on the NEES cost function. Please note the logarithmic scale on the y-axis.

In FIG. 6, the second scenario is depicted in which the vehicle 10 and the target object 23 move perpendicular to each other with the same constant velocity, e.g. having an absolute value or magnitude of 50 km/h. Therefore, a constant azimuth angle is assumed for the target object 23 with respect to the vehicle 10. In detail, the velocity of vehicle 10 is (50,0) km/h, whereas the velocity of the target object 23 is (0, −50) km/h. For the time steps, dt=100 ms is used again, and the same detection accuracies or standard deviations are assumed as for the first scenario, e.g. $\sigma_\theta$=0.3 deg, $\sigma_r$=0.15 m and $$\sigma_{\dot{r}_{comp}} = 0.05 \frac{m}{s}.$$

Single point detections are generated again from the left corner of the target object 23 for each time step.

The results as shown in FIG. 7 correspond to the results as shown in FIG. 3 for the first scenario. That is, all general explanations regarding the diagrams and the reference numbers as provided for FIGS. 3 and 4 are also valid for FIGS. 7 and 8. However, the velocity of the target object 23 is represented by a reference 35 at (−13,89, −13,89) m/s which is the relative velocity with respect to the vehicle 10 for the second scenario. In other words, the velocity of the vehicle 10 is compensated for the reference 35 in FIGS. 7 and 8.

Figure 7A:
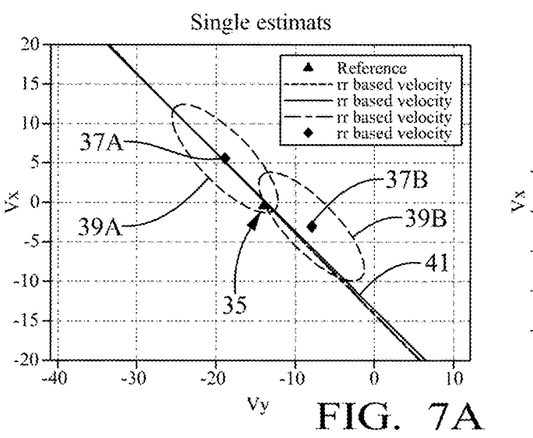

As can be seen in FIG. 7A, the single estimates 37A, 37B based on the position difference strongly deviate from the reference 35, and the range rate based estimate of the velocity is only able to cover the radial component with respect to the vehicle 10, but not the lateral component of the velocity. Hence, the range rate-based estimates 41 are again represented by lines. The three lines which are denoted by "rr based velocity" in FIG. 7A correspond again to the three detections of the range rate and are again almost identical (see also FIG. 3A).

Figure 7B:
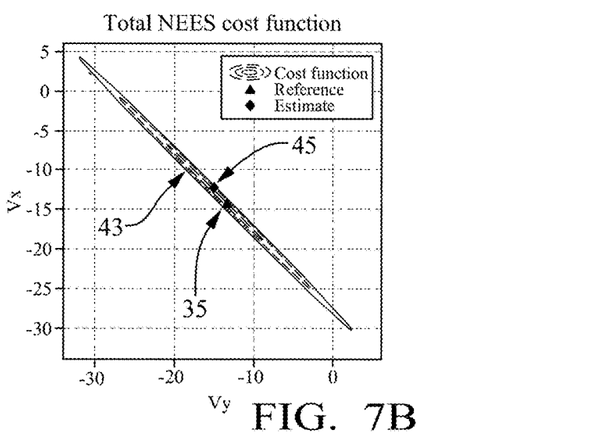
Figure 7C:
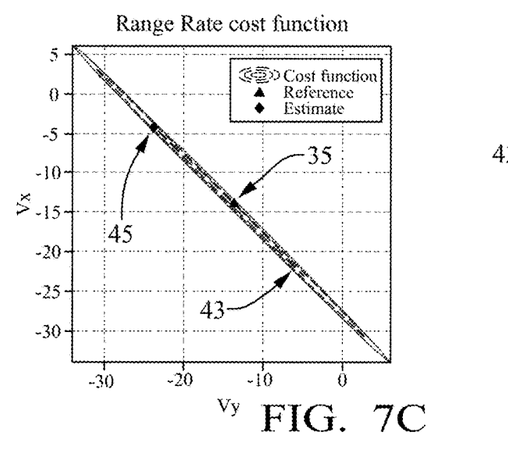
Figure 7D:
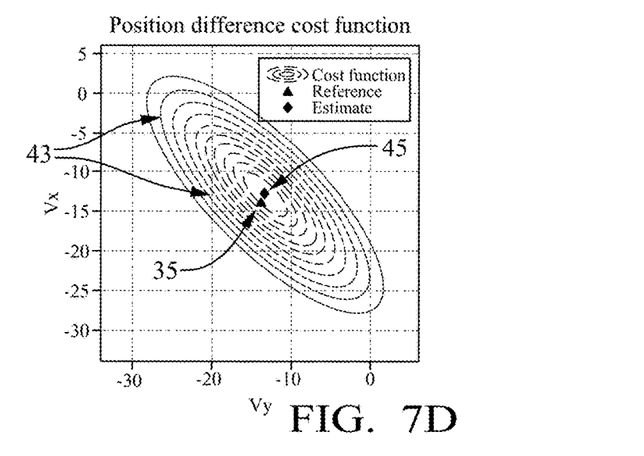

As shown in FIGS. 7B and 7D, the velocity estimates 45 based on the total NEES cost function and based on the position difference cost function are very close to the reference 35, whereas the estimate 45 based on the range rate cost function (see FIG. 7C) strongly deviates from the reference 35. Furthermore, the spread of the cost function is much larger for the position difference cost function than for the total NEES cost function, as can be derived from the contour lines 43 representing the cost functions. As a result, the velocity estimate 45 based on the total NEES cost function has to be regarded as more reliable than the estimate based on the position difference cost function and based on the range rate cost function respectively.

FIG. 8 depicts the results of thousand Monte Carlo simulations assuming the same conditions as for FIG. 7, e.g. respective estimations based on three radar scans. As can be seen in FIGS. 8B, 8C and 8D, the total NEES cost function again shows the lowest spread with respect to the reference 35 for the velocity estimates 45 which are related to the second scenario as shown in FIG. 6. This confirms that the velocity estimate 45 based on the total NEES cost function shows the highest accuracy and reliability in comparison to the further estimates 45 since two "sources" are included for calculating the total NEES cost function.

Figure 8A:
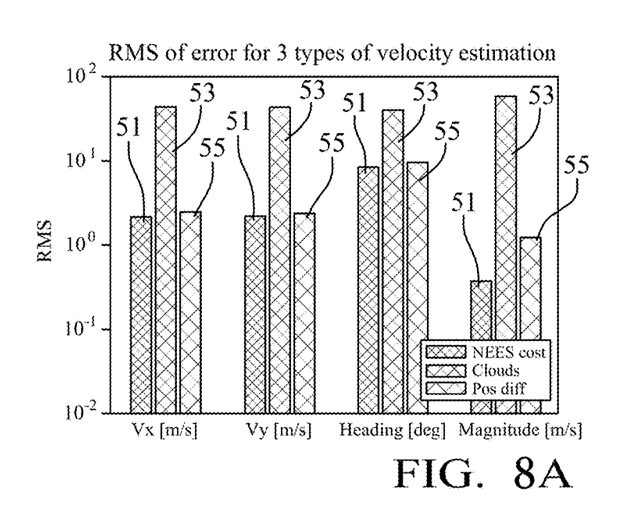
Figure 8B:
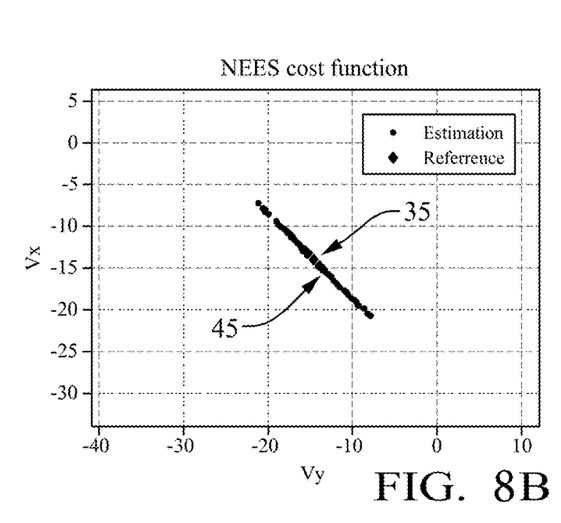
Figure 8C:
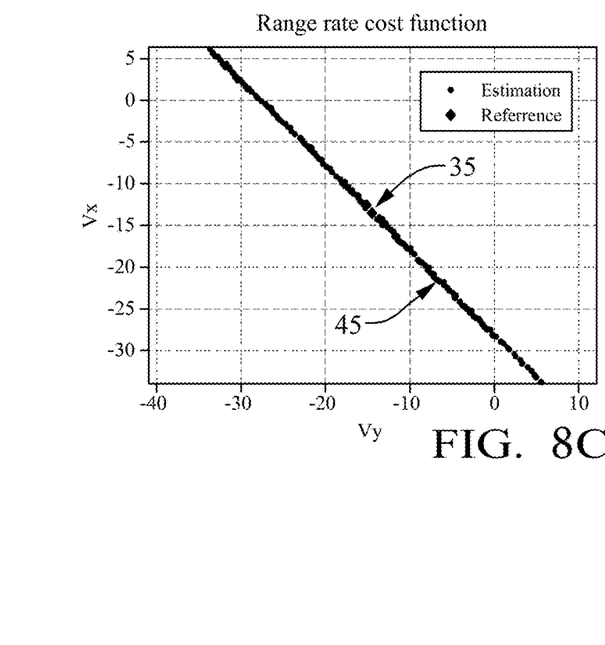
Figure 8D:
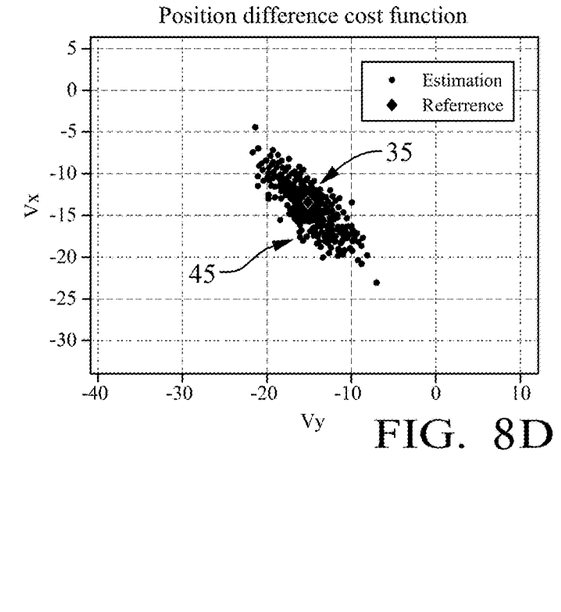
Figure 9A:
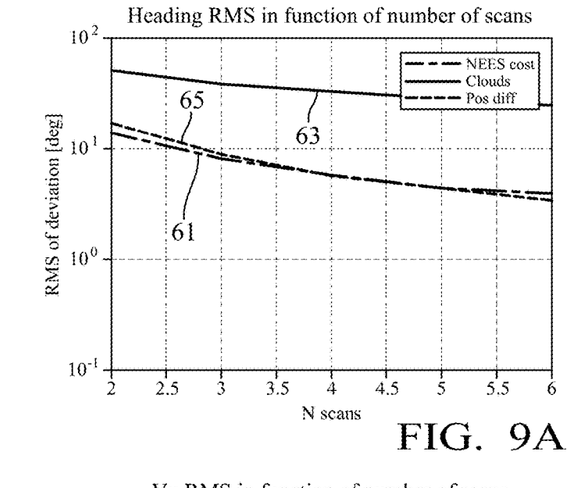
Figure 9B:
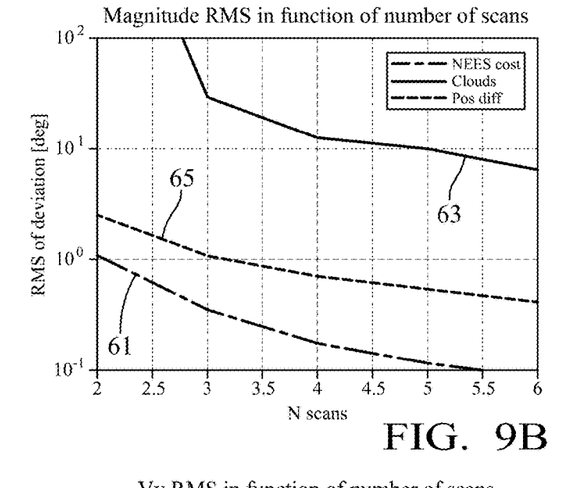
Figure 9C:
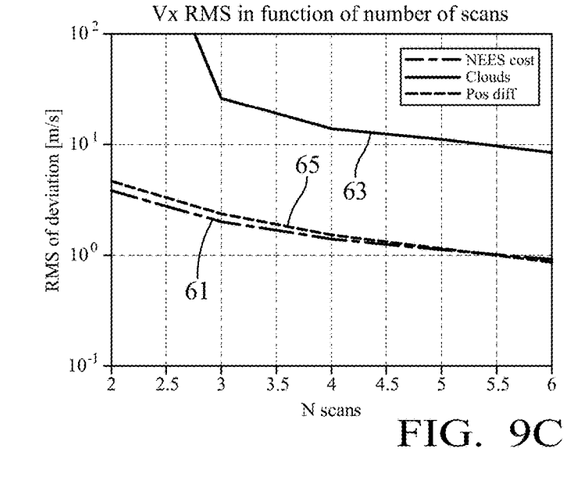
Figure 9D:
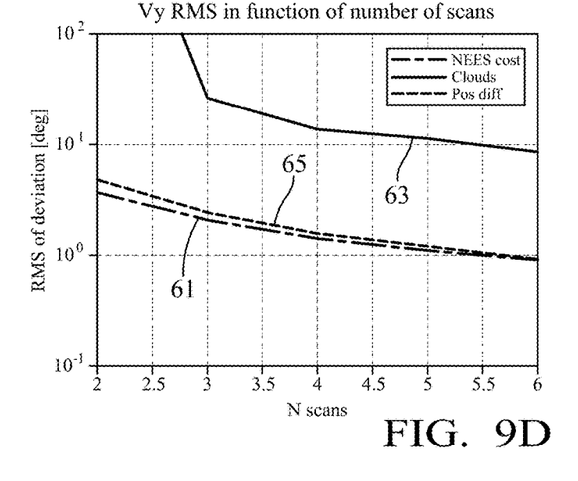

In FIG. 8A, the root mean square of the error for deviation is shown again for the three types of velocity estimation, wherein the bars 41 represent the root mean square of the deviations for the NEES cost function, whereas the bars 53 represent the root mean square of the deviations for the estimates based on the range rate cost function, and the bars 55 represent the root mean square of the deviations for the estimates based on the position difference cost function. Please note that the term "cloud" is used as synonym for the range rate cost function in the legend of FIG. 8A. For the second scenario (see FIG. 6), the estimates 45 based on the total NEES cost function show again the lowest root mean square for the deviations, e.g. for both components $V_x$ and $V_y$ of the velocity, for the heading and for the magnitude.

This is also confirmed by the lines 61, 63 and 65 for the root mean square for the deviations of the heading (FIG. 9A), of the magnitude (FIG. 9B), of the component $V_x$ (FIG. 9C) and of the component $V_y$ (FIG. 9D) which are depicted as depending from the number of radar scans. The root mean square for the deviations of the estimates based on the total NEES cost function (line 61) is lower in almost all cases than the root mean square of the deviation for the estimates based on the position difference cost function (line 63) and based on the range rate cost function (line 65). Please note again the logarithmic scale on the y-axis.

In summary, the results for both scenarios (see FIG. 3 and FIG. 6) verify that the method according to the disclosure improves the accuracy and the reliability of the velocity estimates. This is at least partly due to the fact that the estimates rely on the total NEES cost function which includes two contributions or sources for the velocity estimates.

What is claimed is:

1. A method comprising:
acquiring, via a sensor, detections of a range, an azimuth angle, and a range rate of an object in an environment of a vehicle for at least two different points in time;
via a processing unit:
generating a cost function that depends on a first source and a second source, the first source based on a range rate velocity profile that depends on the rate range and the azimuth angle and the first source depends on an estimated accuracy for the first source, the second source based on a position difference that depends on the range and the azimuth angle for the at least two different points in time and the second source depends on an estimated accuracy for the second source; and determining a velocity estimate for the object by minimizing the cost function,
wherein
a plurality of detections of the range, the azimuth angle, and the range rate are acquired for the object for each of the at least two points in time;
a respective standard deviation is estimated for the range, the azimuth angle, and the range rate based on the plurality of detections; and
the first source and the second source are based on a normalized estimation error squared (NEES) that includes the respective standard deviations of the range, the azimuth angle, and the range rate.

2. The method of claim 1, wherein:
the range rate velocity profile depends on the plurality of detections of the rate range and the azimuth angle;
the position difference depends on the plurality of detections of the range and the azimuth angle for the at least two different points in time;
the estimated accuracy of the first source depends on the standard deviation of the range rate and the standard deviation of the azimuth angle; and
the estimated accuracy of the second source depends on the standard deviation of the range and the standard deviation of the azimuth angle.

3. The method of claim 2, wherein:
different standard deviations of the range, the azimuth angle, and the range rate are estimated for at least one of:
each of the at least two points in time; or
each detection of the range, the azimuth angle, and the range rate.

4. The method of claim 2, wherein:
the cost function comprises a first contribution based on a normalized estimation error squared (NEES) related to the first source and a second contribution based on a normalized estimation error squared (NEES) related to the second source.

5. The method of claim 4, wherein:
the first contribution and the second contribution each comprise a sum of elements over the plurality of detections and each element is estimated as a normalized estimation error squared (NEES) for the respective detection.

6. The method of claim 5, wherein:
the elements of the first contribution are based on a range rate equation and on the standard deviation of the range rate.

7. The method of claim 5, wherein:
the elements of the second contribution are based on:
the position difference for the respective detection,
a velocity covariance matrix estimated based on the standard deviations of the range and the azimuth angle, and
a time interval between the at least two different points in time for which the range and the azimuth angle are acquired by the sensor.

8. The method of claim 5, wherein:
the cost function is generated as an average of the first contribution and the second contribution.

9. The method of claim 1, wherein:
a component of the velocity is estimated by setting a derivative of the cost function with respect to a velocity component to zero.

10. The method of claim 1, wherein
the cost function and the velocity estimate are determined by assuming a constant velocity of the object (23) in order to initialize a Kalman filter state estimation of the velocity.

11. A device comprising:
a sensor configured to provide data for acquiring detections of a range, an azimuth angle, and a range rate of an object in a field of view of the sensor for at least two different points in time; and
a processing unit configured to:
generate a cost function that depends on a first source and a second source, the first source based on a range rate velocity profile that depends on the range rate and the azimuth angle and the first source depends on an estimated accuracy for the first source, the second source based on a position difference which depends on the range and the azimuth angle for the at least two different points in time and the second source depends on an estimated accuracy for the second source; and
determine a velocity estimate for the object by minimizing the cost function,
wherein the processing unit is further configured to:
acquire a plurality of detections of the range, the azimuth angle, and the range rate for the object for each of the at least two points in time; and
estimate a respective standard deviation for the range, the azimuth angle, and the range rate based on the plurality of detections;
wherein the first source and the second source are based on a normalized estimation error squared (NEES) that includes the respective standard deviations of the range, the azimuth angle, and the range rate.

12. The device of claim 11, wherein the sensor includes at least one of: a radar sensor or a Lidar sensor.

13. The device of claim 11, wherein the device comprises a vehicle.

14. The device of claim 11, wherein:
the range rate velocity profile depends on the plurality of detections of the rate range and the azimuth angle;
the position difference depends on the plurality of detections of the range and the azimuth angle for the at least two different points in time;
the estimated accuracy of the first source depends on the standard deviation of the range rate and the standard deviation of the azimuth angle; and
the estimated accuracy of the second source depends on the standard deviation of the range and the standard deviation of the azimuth angle.

15. The device of claim 11, wherein:
the first contribution and the second contribution each comprise a sum of elements over the plurality of detections, wherein each element is estimated as a normalized estimation error squared (NEES) for the respective detection.

16. The device of claim 15, wherein:
the elements of the first contribution are based on a range rate equation and on the standard deviation of the range rate.

17. The device of claim 15, wherein:
the elements of the second contribution are based on:
the position difference for the respective detection,
a velocity covariance matrix estimated based on the standard deviations of the range and the azimuth angle, and a time interval between the at least two different points in time for which the range and the azimuth angle are acquired by the sensor.

18. A computer-readable storage media storing computer-readable instructions that, when executed by one or more processors, cause the one or more processors to:

receive, via a sensor, data for acquiring detections of a range, an azimuth angle, and a range rate of an object in a field of view of the sensor for at least two different points in time;

generate a cost function that depends on a first source and a second source, the first source based on a range rate velocity profile that depends on a range rate and the azimuth angle and the first source depends on an estimated accuracy for the first source, the second source based on a position difference which depends on the range and the azimuth angle for the at least two different points in time and the second source depends on an estimated accuracy for the second source;

determine a velocity estimate for the object by minimizing the cost function;

acquire a plurality of detections of the range, the azimuth angle, and the range rate for the object for each of the at least two points in time; and estimate a respective standard deviation for the range, the azimuth angle, and the range rate based on the plurality of detections;

wherein the first source and the second source are based on a normalized estimation error squared (NEES) that includes the respective standard deviations of the range, the azimuth angle, and the range rate.

* * * * *